(No Model.)

C. C. STOCKARD, Sr.
GARDEN HOE PLOW.

No. 492,120. Patented Feb. 21, 1893.

Witnesses:
W. E. Boughton
A. M. Parkins

Inventor:
Charles C. Stockard, Sr.
by Seumer & Goldsborough
Attys.

UNITED STATES PATENT OFFICE.

CHARLES CECIL STOCKARD, SR., OF COLUMBUS, MISSISSIPPI.

GARDEN-HOE PLOW.

SPECIFICATION forming part of Letters Patent No. 492,120, dated February 21, 1893.

Application filed April 28, 1892. Serial No. 431,031. (No model.)

*To all whom it may concern:*

Be it known that I, CHARLES CECIL STOCKARD, Sr., a citizen of the United States, residing at Columbus, in the county of Lowndes and State of Mississippi, have invented certain new and useful Improvements in Garden-Hoe Plows; and I do hereby declare the following to be a full, clear, and exact description of the invention, such as will enable others skilled in the art to which it appertains to make and use the same.

The invention relates generally to hand implements for use in gardening and trucking, and, having special reference to hand-hoes or plows for use in working and cultivating vegetables, flowers, and all kinds of small plants, consists in the double-pointed, reversible hoe, made and constructed as represented in the accompanying drawings, and as described and more particularly pointed out in the following specification and claims.

Figure 1:
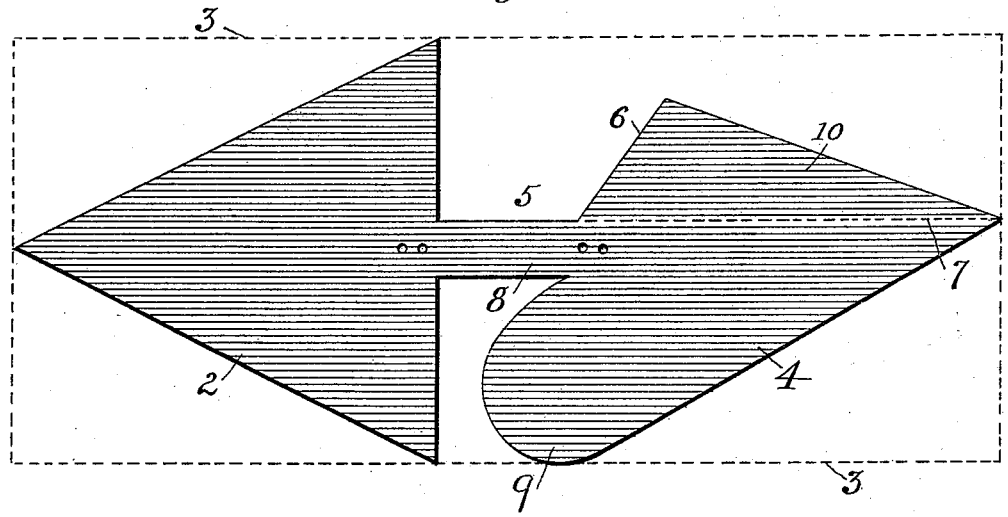
Figure 2:
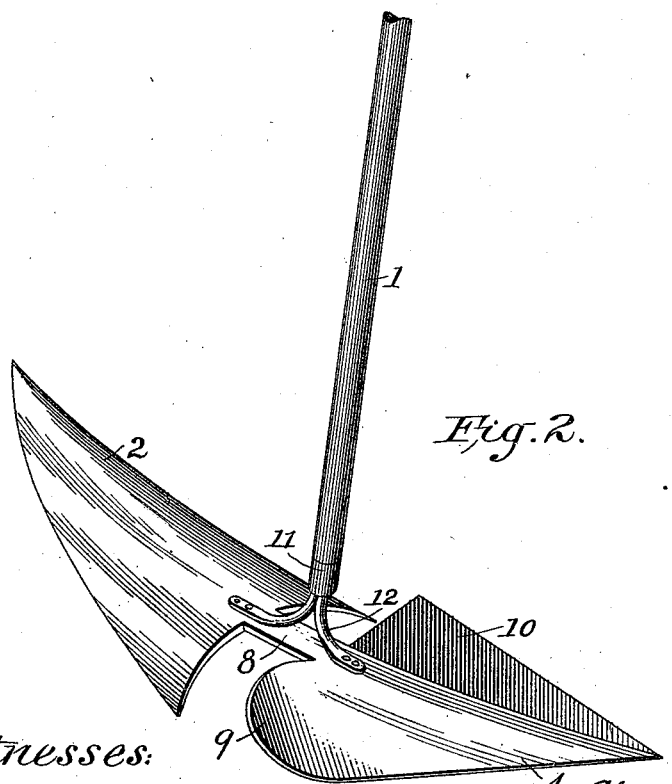

Referring to the annexed drawings, Figure 1 illustrates the blank out of which the blade of the implement is formed; Fig. 2 is a perspective view of the completed implement.

The dotted line rectangle 3 shown in Fig. 1 indicates a flat piece of sheet steel, out of which is stamped or struck up by any suitable machinery for that purpose the blank 5; or the blank may be chiseled out by hand. This blank is of the general configuration shown in the drawings; that is to say, with one-half 2 cut in the form of an ordinary arrow-head, and the other half 4 in an elongated heart-shaped form with one of the lobes cut off as indicated at 6, the two parts or blades being joined by the connecting strip 7. The metal forming this blank should be thickest at the center, along the median line from point to point, and be tapered or thinned down toward the outer side edges, as represented in Fig. 2, so as to give the blades of the implement the requisite stiffness and strength. Rivet holes 8 are formed at the head of each blade as indicated preferably in the process of stamping the blank, though, of course, they may be punched out by hand afterward. In order to form the hoe out of this blank, the blade 2 is concaved on the outer side as indicated in Fig. 2, and preferably slightly curved in the direction of its length as shown. The triangular part 10 of the blade 4, lying between the dotted line 7 and the upper edge of the blank in Fig. 1, is bent at a right angle to the face of the blade on the side to which the handle is to be secured. The lobe or curved corner piece 9 of the other part of the blade 4 is bent or slightly curved in the same general direction, that is toward the handle side of the blank. The blade 4 is curved slightly in the direction of its length, like the blade 2, so that the entire hoe is formed on a curve whose concave side is toward the handle. The bending or curving of the part 9 also slightly bends the blade 4, the bent or hollowed part being, however, on the reverse side of the blank from that of the blade 2.

The handle is denoted by 1. It may be connected to the combined blade above described in any suitable manner. As shown in the accompanying drawings, it is connected by a ferrule or thimble 11, and stout metallic rods 12, the latter being secured rigidly to the heads of the respective blades by rivets or bolts passing through the holes shown in the blank in Fig. 1. The part 10, as will be seen from the drawings, stands in line with the handle. Its edge is preferably sharpened, and it is intended as a cutting knife or shear blade. The curved part 9 acts as a sort of mold board, and turns the soil away from the part 10.

As thus constructed, the implement is capable of a variety of uses in the cultivation of small plants. It may be used as a hoe purely, for chopping, hoeing, or weeding; or it may be used as a hand plow or scraper by drawing it toward the workman by the handle, instead of pushing. In this way it is especially adapted for working or cultivating small vegetables or plants in rows, the blade 2 acting to form a furrow between the rows and to turn the soil up to the roots of the plants in each row, and the blade 4 acting to cut the crust and enable the gardener to shear off close to a row of small plants and throw all the dirt to one side. The shear blade 10 may be formed on either side of the blank, as required by right or left-handed persons, and the form, size, and configuration of the blades may be modified as particular uses may suggest.

Having thus described the invention, what I claim, and desire to secure by Letters Patent, is—

1. A hand implement for use in gardening and trucking, the same consisting in the double-pointed, reversible blade 5, having the concaved arrow-head shaped part 2, and the part 4 formed with the straight shear blade 10 and the curved edge 9, and the connecting strips 8, all formed integrally out of a single piece of sheet metal, substantially as described.

2. A hand implement for use in gardening and trucking, the same consisting of the double-pointed, reversible blade 5, having the concaved arrow-head shaped part 2, and the part 4 formed with the straight shear blade 10 and the curved edge 9, the whole being formed integrally out of a single piece of sheet metal with the connecting strip 8 between the blades, and having a handle as 1 suitably connected thereto, substantially as described.

In testimony whereof I affix my signature in presence of two witnesses.

CHARLES CECIL STOCKARD, SR.

Witnesses:
W. H. LEE,
D. P. WARING.